L. PATTBERG.
PICTURE-FRAMES.
No. 195,530. Patented Sept. 25, 1877.
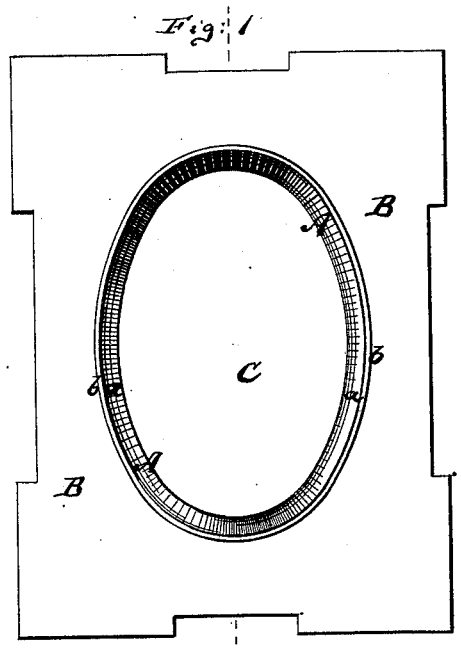
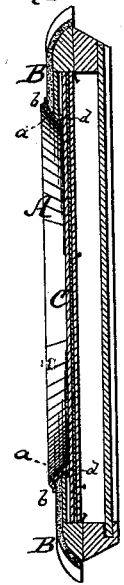
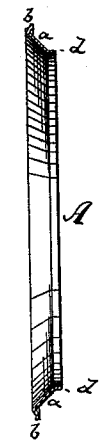
Witnesses:
John C. Tunbridge.
Ernest C. Webb
Inventor:
Lewis Pattberg
by his attorney
A. v. Briesen

UNITED STATES PATENT OFFICE.

LEWIS PATTBERG, OF JERSEY CITY, NEW JERSEY.

IMPROVEMENT IN PICTURE-FRAMES.

Specification forming part of Letters Patent No. 195,530, dated September 25, 1877; application filed August 25, 1877.

*To all whom it may concern:*

Be it known that I, LEWIS PATTBERG, of Jersey City, in the county of Hudson and State of New Jersey, have invented an Improved Construction of and Design for a Picture-Frame, of which the following is a specification:

Figure 1 is a face view of my new picture-frame. Fig. 2 is a vertical central section of the same; Fig. 3, a detail vertical section of the sheet-metal molding used thereon.

Similar letters of reference indicate corresponding parts in all the figures.

The object of this invention is to carry the oblique sheet-metal molding which lines the inner edge of a picture-frame directly against the glass, thereby increasing the effect of the molding and throwing the picture farther forward than it appears to be if the oblique molding does not come into direct contact with the glass. This effect is produced by the construction of the molding hereinafter described.

In the drawing, the letter A represents the sheet-metal molding or lining, which is placed against the inner edge of the body of the frame B. The body of the frame is made of wood, pasteboard, or other suitable material. Its inner part—by which I mean the part lined by the molding A—is usually plain pasteboard, covered with velvet or other beautifying substance.

Heretofore, in fastening such moldings to frames, it was customary to secure to the molding an additional separate sheet-metal strip, which was afterward turned back of the frame, so as to hold the molding in place. To join this sheet-metal rim or strip to the molding was a difficult matter, requiring considerable skill and loss of time; and it had the further disadvantage that the metal turned back of the frame, unless smoothed down with great care, was apt to raise the frame off the glass and impair the appearance of the entire picture.

My molding A, which is made of sheet metal, has a body portion, $a$, set oblique, and has its outer edge bent outward and formed into the small molding or rim $b$. The inner edge of the molding is bent into the shape of a flat ring, $d$, as shown in Fig. 3. When this molding is attached to the frame the outer rim $b$ rests upon the outer face of the frame, and the inner ring $d$ is then turned up against the inner face of said frame, so as thus to clasp the frame between the rim $b$ and the ring $d$, as is clearly shown in Fig. 2 of the drawing. By this means I bring the oblique face of the molding A directly against the glass C, as is also clearly shown in Fig. 2, and avoid thus the steep shoulder or ridge which has heretofore been formed on such moldings.

I claim as my invention—

1. The sheet-metal molding A, made with the outwardly-projecting rim $b$ and with the inner flat ring $d$, and intervening oblique body $a$, the oblique body being in direct contact with the ring $d$, substantially as herein shown and described.

2. The combination of the sheet-metal molding A, which is composed of the rim $b$, oblique body $a$, and inner ring $d$, with the frame B, and with the glass C, all arranged so that the oblique face $a$ of the molding will reach directly to the glass, substantially as specified.

LEWIS PATTBERG.

Witnesses:
 T. R. PATTBERG,
 ERNEST C. WEBB.